Patented Aug. 3, 1937

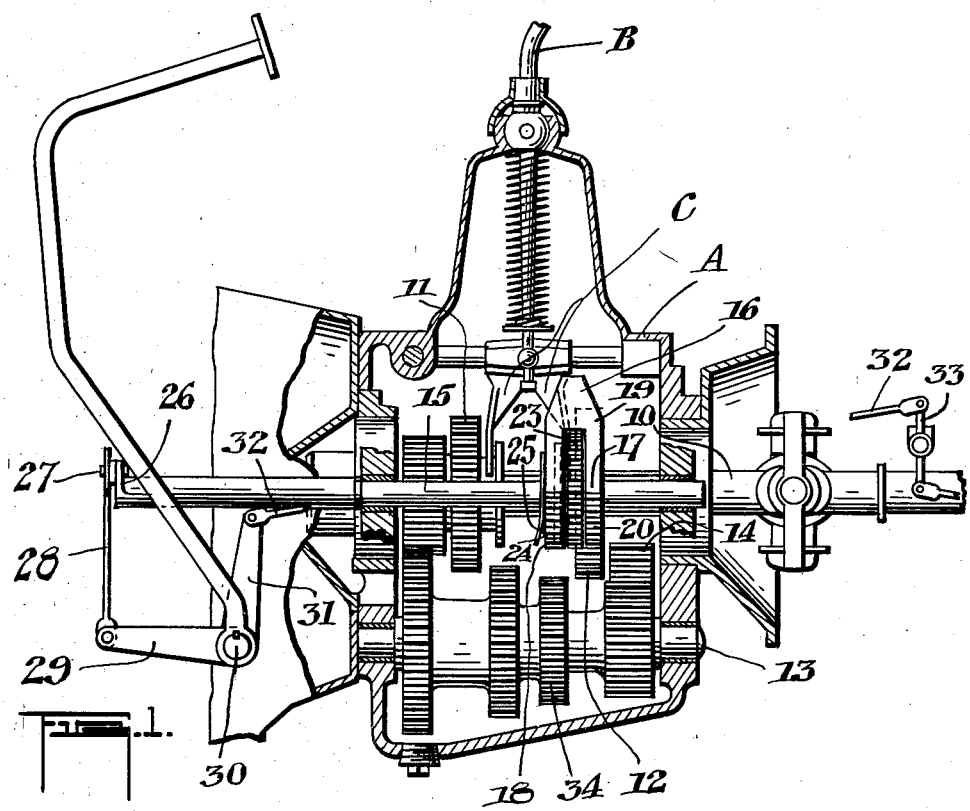
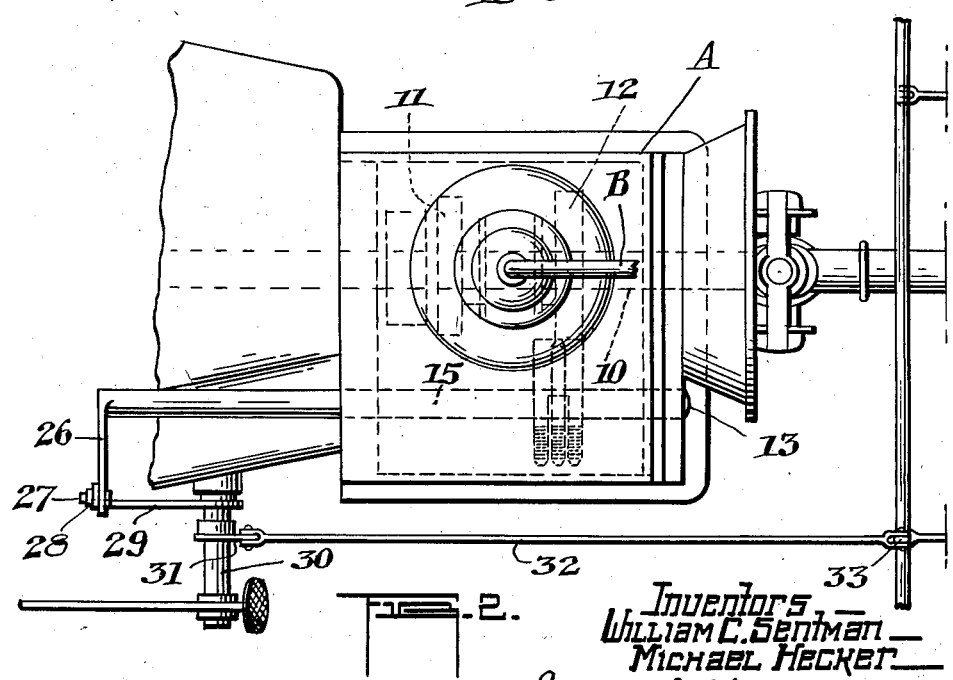

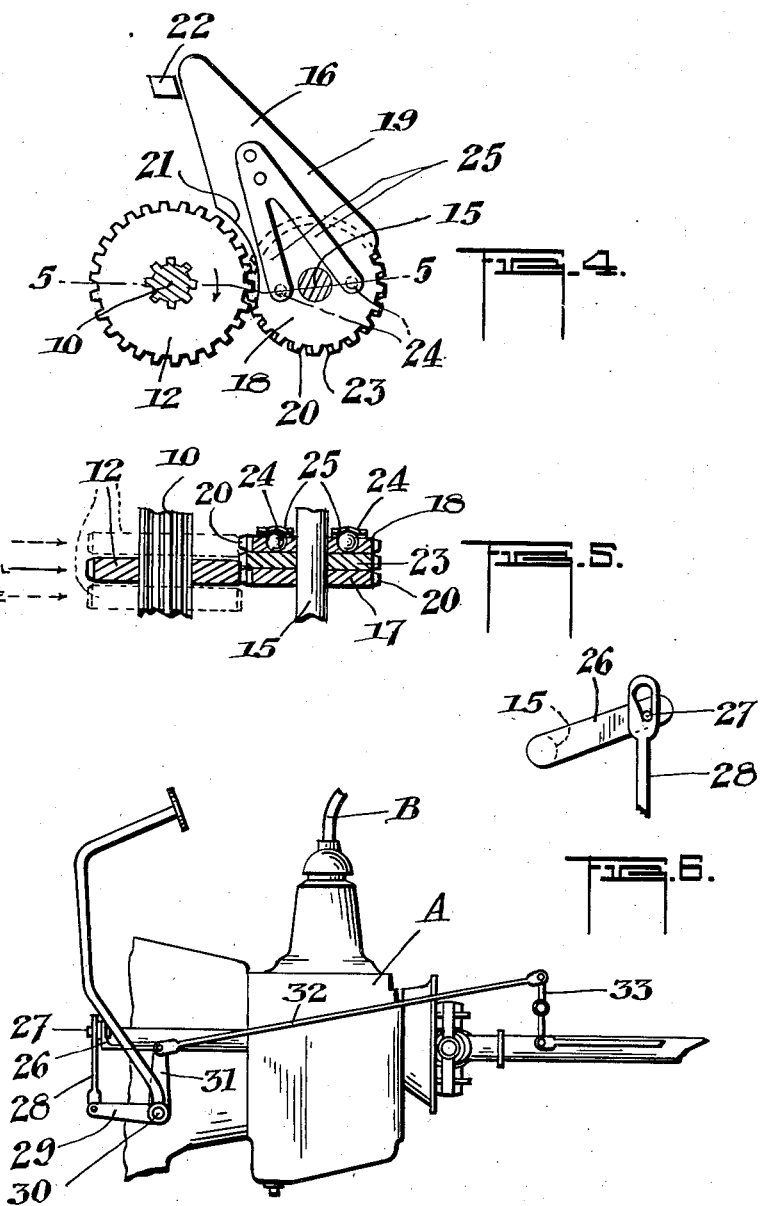

2,088,725

UNITED STATES PATENT OFFICE 2,088,725

AUTOMATIC BRAKING DEVICE FOR AUTOMOBILES

William C. Sentman and Michael Hecker, Kellogg, Idaho, assignors of one-third to Andrew E. Cowles, Kellogg, Idaho Application September 28, 1936, Serial No. 103,034

4 Claims. (Cl. 192—4)

This invention relates to automatic braking devices for automobiles.

An object of the invention is to provide a simply constructed, efficient and durable device for quickly and securely holding an automobile from backing when ascending an incline when the gear shift lever is in any of its several positions with the exception of reverse.

A further object of the invention is to provide a construction wherein the automobile brakes will be automatically applied with the operation of the braking device and automatically released when the car proceeds in a forward direction again.

A further object of the invention is to provide a construction which will avoid any necessity of applying the brakes when shifting gears for moving the car in a forward direction while on an up grade.

A still further object of the invention is to provide a construction which may be applied to any automobile or truck having a sliding gear transmission and operable with any type of brake in common use.

With these and other objects in view, the invention consists essentially in the provision within the transmission box of a shaft carrying a gear at least freely rotatable on the shaft in one direction and engageable with a sliding gear of the transmission at all times, with the sole exception that such engagement does not take place when the sliding gear is moved to reverse position. Preferably this gear is associated with a cam gear but independently movable while frictionally engaged therewith so that, when the car is in neutral, high, low or intermediate and is moving in a forward direction, the independently movable gear engaged with the sliding gear will freely rotate while the cam gear is held against movement but, when the car moves in a rearward direction while the sliding gear is positioned as aforementioned, the independently movable gear frictionally engaged with the cam gear will pull the cam gear into engagement with the sliding gear. Coupled with the mounting of the cam gear is provided means for connecting with the brake operating means of the automobile whereby, on operation of the cam gear, the brakes are automatically applied, as described in the following specification and illustrated in the accompanying drawings.

In the drawings:

Figure 1 is an enlarged fragmentary sectional elevation of the transmission of a car, showing our improved braking device mounted within the transmission and the connection as between the braking device and the brake operating means of the car.

Figure 2 is an enlarged fragmentary plan view of the transmission gear box showing the gears in dotted lines and illustrating the connection between the shaft carrying the automatic braking device and the brake operating means of the car.

Figure 3 is a fragmentary side elevation of the transmission showing the brake connections.

Figure 4 is an enlarged fragmentary end elevation of one of the sliding transmission gears and the cam gear carrying the independently movable gear, the latter being shown engaged with the sliding transmission gear.

Figure 5 is a section on the line 5—5 of Figure 4, showing the sliding transmission gear in neutral position and in engagement with the cam gear and the independently movable gear carried thereby and also illustrating in dotted lines the position of the sliding transmission gear when it is shifted either to reverse or low gear.

Figure 6 is a fragmentary detail view of one form of connection which might be effected between the arm 26 and the connecting rods 28 to permit independent manual operation of the brakes of the automobile.

Referring to the drawings, A indicates the gear box for the transmission of a car, B indicates the gear shifting lever and C indicates the gear shifting forks connected with the gear shifting lever B in the usual manner. The spline shaft is indicated at 10 and carries thereon the usual sliding transmission gears 11 and 12 which are operated by the forks C in the usual manner. The gear 11 constitutes the intermediate and high sliding gear while gear 12 constitutes the low and reverse sliding gear. On the countershaft 13 the usual countershaft gears are positioned while beside the countershaft and opposite reverse gear the reverse idler gear 14 is positioned.

According to the invention, within the gear box A there is provided a unit for effecting automatic braking action, the unit including a second countershaft 15 extending through the gear box and a cam gear 16 mounted in a position that it may co-operate with the sliding gear 12. The construction of the cam gear 16 is clearly illustrated as between Figures 1, 4, and 5. As shown in Figure 1, this gear is forked or bifurcated, providing two arms 17 and 18 and a main body 19 from which the arms project. The lower surface of the arms is arcuate and toothed as at 20. The body 19 is elongated in character and both the body and arms are formed with a common cut-out portion 21 on one side, or otherwise gradually reduced, to provide a clearance for the sliding transmission gear 12, so that in normal position, when the elongated body engages a suitable stop 22, the sliding transmission gear will not engage the cam gear.

Included in the construction of the unit and positioned in between the arms 17 and 18 of the cam gear, an independently movable gear 23 is positioned and mounted on the shaft 15. This gear is held in frictional engagement with the cam gear in any suitable manner, such as by the balls 24 positioned in suitable orifices in the arm 18 of the cam gear and projecting into engagement with the gear 23. A suitable spring device 25 may cause the balls to maintain a sufficient degree of frictional contact with the gear 23. The gear 23 projects from the cam gear into the arcuate cut-out portion 21, or a suitably reduced portion thereof, and into engagement with the sliding transmission gear 12, it being obvious that when the latter is rotating in a clockwise direction, it will cause the gear 23 to rotate independently of the cam gear. However, when the gear 11 is rotated in an anti-clockwise direction, the gear 23 in engagement therewith will cause the came gear to move, inasmuch as there is nothing to prevent its movement in this direction, and upon slight movement of the cam gear the teeth 20 are immediately caused to engage with the teeth of the sliding gear 12.

Simultaneously with the operation of the cam gear, the brakes of the car are applied. This is effected according to the embodiment of my invention here shown by means of extending the shaft 15 forwardly and out of the gear box A and providing the outer end of the shaft with a short arm 26 designed to engage, by means of a suitable pin or the like 27 on the arm 26, with one end of a slot in a connecting rod 28, the latter being in turn pivotally connected with an arm 29 mounted on the brake pedal shaft 30. Thus, through the usual brake operating connections 31, 32 and 33, the brakes of the car are immediately applied and may be applied manually through the brake pedal at any time independently of the cam gear and without affecting the latter, by reason of the slot and pin connection or other suitable connection to permit this variable action.

The cam gear and the brakes of the car will be brought into operation when the car proceeds to move rearwardly down a grade in all positions of the sliding transmission gears with the exception of reverse. For instance, on referring to Figure 1, it will be noted that the gear box is in neutral and in this position the sliding gear 12 is in mesh with the gear 23, the sliding gear 12 being positioned slightly rearward of the center of gear 23. Consequently, when the gear 12 is moved forwardly into low gear 34 on the countershaft 13, it will be apparent that it will still maintain engagement with gear 23 (see Figure 5). When, however, the sliding gear 12 is returned to neutral and then moved into reverse when it engages with reverse idler gear 14, it will be seen that it is moved to a position where it will not engage with gear 23 (see, for instance Figure 5) and, consequently, the car is free to move in a rearward direction. On the other hand, when the sliding gear 11 is moved into high and intermediate, gear 12 is in mesh with gear 23. Thus, in all positions with the exception of reverse, the braking device will operate and function to actuate braking systems of the car.

After the brakes have been automatically applied following, for instance, the stalling of the automobile on an upward grade, it is apparent that when the motor is started up again and the gear shift is moved to the desired position, should it be necessary to change gears, the resulting clockwise rotation of the spline shaft will cause the cam gear to be moved immediately back to its normal position. This result follows by reason of the fact that the cam gear is engaged with one of the sliding transmission gears and it will be caused to move until its teeth are free from the transmission gear at which point the body portion 19 of the gear will engage the stop 22 when the freely rotatable gear alone will continue to rotate with the sliding transmission gear with which it engages. It will be obvious also that when the teeth of the cam gear move out from engagement with the teeth of the sliding transmission gear during this operation, if the cam gear is so shaped that the elongated body 19 has not reached the position to engage with the stop 22, that the weight of the elongated body would tend to cause the cam gear to move further until the stop was engaged, whereas, in any case the frictional engagement of the freely rotatable gear 23 with the cam gear would necessarily move it further to engage the stop.

The foregoing illustrates the preferred construction and operation of our invention. It will be apparent, however, that while following this principle, the construction might be modified somewhat.

Various modifications may be made in the invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What we claim is:—

1. An automatic braking device for automobiles and in combination with the gear box, and braking system therefor, the gear box including a spline shaft having sliding transmission gears thereon, and a countershaft having low, intermediate and reverse gears thereon, comprising a second countershaft mounted in the gear box, a cam gear mounted on said second countershaft to rotate the latter and disposed adjacent to and within the sliding range of one of said sliding gears, a freely rotatable gear mounted on the second countershaft and associated with said cam gear, said freely rotatable gear being frictionally engaged with the cam gear and constantly engaged with adjacent transmission sliding gears when the sliding gears are moved to neutral, low, intermediate or high positions, means for preventing movement of the cam gear when said spline shaft is rotating during forward movement of the automobile, said cam gear being pulled into engagement with said sliding gear through said frictionally engaged freely rotatable gear when said spline shaft rotates during the rearward movement of said vehicle, and means connected with the braking system of the automobile and actuated through said cam gear for automatically actuating said braking system simultaneously with the movement of said cam gear engaging said sliding gear.

2. The device as claimed in claim 1 in which the cam gear is bifurcated, the freely rotatable gear being disposed on the second countershaft within the bifurcation of the cam gear.

3. A device as claimed in claim 1 in which the cam gear is formed with an elongated body portion and a stop member is provided within the gear box for engaging the elongated body portion to prevent movement of the cam gear in one direction from a predetermined position.

4. An automatic braking device for automobiles and in combination with the gear box, and braking system therefor, the gear box including a spline shaft having sliding transmission gears thereon, and a countershaft having low, intermediate and reverse gears thereon, comprising a second countershaft mounted in the gear box, a rotatable cam gear mounted on said second countershaft and disposed adjacent to and within the sliding range of one of said sliding gears, a freely rotatable gear mounted on the second countershaft and associated with said cam gear, said freely rotatable gear being frictionally engaged with the cam gear and constantly engaged with adjacent transmission sliding gears when the sliding gears are moved to neutral, low, intermediate or high positions, means for preventing movement of the cam gear when said spline shaft is rotating during forward movement of the automobile, said cam gear being pulled into engagement with said sliding gear through said frictionally engaged freely rotatable gear when said spline shaft rotates during the rearward movement of said vehicle, to lock the spline shaft against movement.

WILLIAM C. SENTMAN.
MICHAEL HECKER.